Patented Jan. 1, 1935

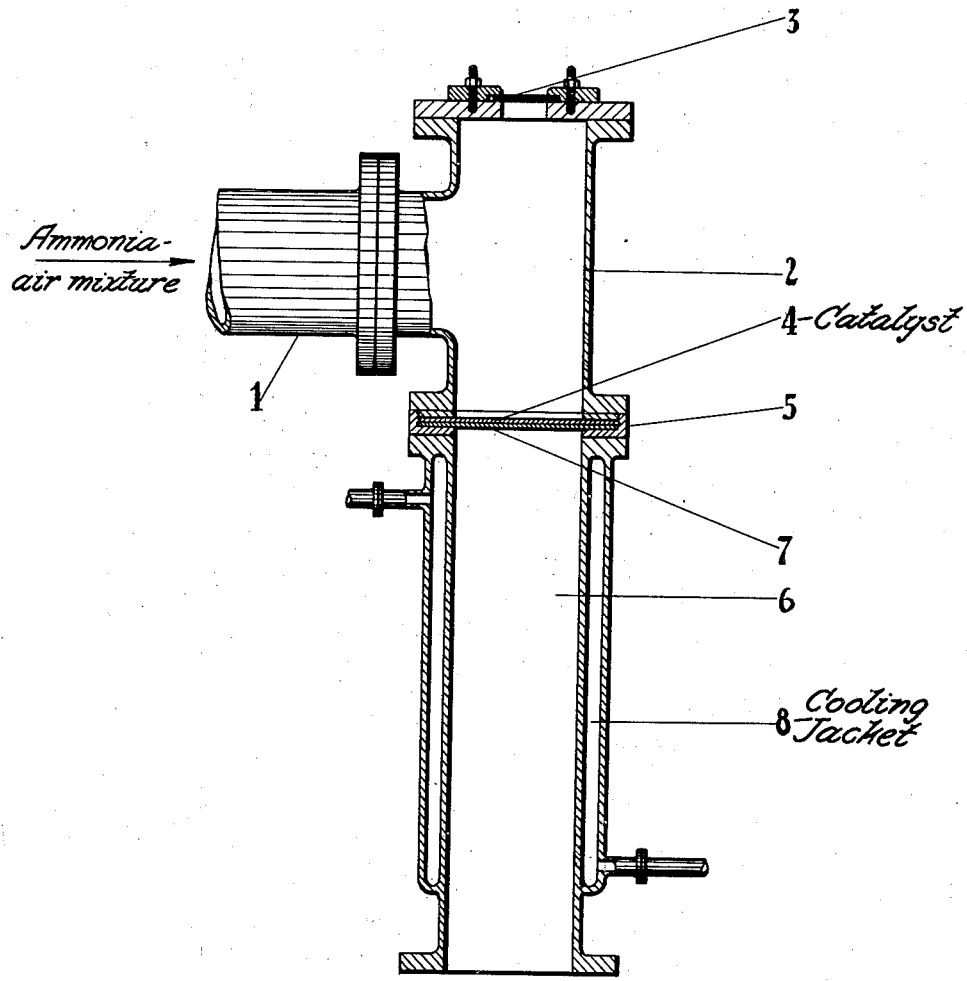

1,986,396

UNITED STATES PATENT OFFICE 1,986,396

AMMONIA OXIDATION PROCESS

Stanley L. Handforth and William E. Kirst, Woodbury, N. J., assignors to E. I. du Pont de Nemours & Company, Wilmington, Del., a corporation of Delaware Application August 26, 1929, Serial No. 388,339

4 Claims. (Cl. 23—162)

This invention relates to a process for oxidizing ammonia to oxides of nitrogen and more particularly it relates to an improved step in the process whereby catalytic decomposition is reduced to a minimum.

Application, Ser. No. 588,884, filed Jan. 26, 1932, and directed to the apparatus, is a division of this application.

It is the practice in carrying out the necessary reaction in this process to mix ammonia and an oxygen containing gas and pass this mixture through a suitable catalyst in a reaction chamber or converter. In order to maintain efficient conversions of ammonia to oxides of nitrogen, it has been necessary to operate the catalyst at temperatures of from 700° C. to 1100° C. To obtain these temperatures, it has been found essential to preheat the gaseous mixture entering the converter chamber. In doing so there has always been some loss of ammonia, due to its being oxidized to free nitrogen or to decomposition of the oxides of nitrogen after they have been formed. The hot surfaces of the metal commonly used act catalytically to increase this loss.

It has previously been the belief that only the decomposition of ammonia to free nitrogen had to be taken into consideration. In order to overcome this it has been suggested that the walls of the chamber preceding the catalyst and the conduit leading to it be jacketed and surrounded by a cooled liquid. Cederberg (U. S. Patent 1,666,958) describes a catalyst chamber, the walls of the reaction zone of which are cooled in order to prevent explosions of the mixture. Cederberg's idea was merely to remove the heat from the catalyst so that richer mixtures of ammonia may be used.

An object of our invention is to overcome the losses in ammonia oxidation processes due to decomposition of the oxides of nitrogen to free nitrogen. A further object of our invention is an improved step in this process whereby increased yields of oxides of nitrogen may be obtained.

Other objects will appear as the description proceeds.

We have found that these objects may be accomplished by maintaining a high gas velocity to and away from the catalyst and also through the catalyst in such manner that the gaseous products of the reaction cannot again come into contact with the catalyst but are removed directly away from the catalyst and not permitted to flow in a direction in parallel with the surface of the catalyst as has been the practice heretofore. These objects are further accomplished by cooling the walls of the chamber and conduit leading away from the catalyst until the gases are cooled to a temperature sufficiently low that appreciable catalytic decomposition will not take place.

We have found also that the decomposition of ammonia directly to nitrogen ahead of the catalyst can be overcome at ordinary operating temperatures by the use of the proper noncatalytic structural materials, and furthermore, that cooling of the walls ahead of the catalyst is not essential. We have found also that a great part of the loss in yield is due to decomposition of the oxides of nitrogen to free nitrogen, caused either by the catalytic action of the catalyst itself or the extremely hot walls of the chamber through which the gases pass immediately after leaving the catalyst. For example, in Cederberg's apparatus, as well as in the apparatus disclosed by Jones and Parsons (U. S. Patent 1,321,376), the gas after passing the catalyst, as well as the gas entering the catalyst, must pass for some distance parallel to the surface of the catalyst and, while the actual velocity of the gas may be high, the velocity away from the catalyst is low. This allows the gas to come into repeated contact with the active catalyst, causing catalytic decomposition and loss, particularly when pressures greater than atmospheric are used. The hot gases leaving the catalyst heat the walls of the exit pipe to a point where they act catalytically on the gas, causing decomposition and loss in yield. Catalysts of the platinum metals volatilize to an appreciable extent at their operating temperatures. A small amount of this active catalyst is deposited on these hot walls which results in increasing their catalytic activity and the consequent loss in yield.

The single figure of the accompanying drawing illustrates one embodiment of our invention. It is to be understood that other embodiments exist and may be practiced within the scope of our invention. The mixed gas preheated to the desired temperature, enters through pipe 1. This may be in the form of a T as shown, so that a sight glass, 3, may be placed in such a position that the catalyst may be observed in operation. The catalyst, 4, is supported in a holder, 5, which in turn may be clamped between the flanges of the inlet T, 2, and the exit pipe 6. The catalyst is preferably supported on a grid or screen, 7, composed of a non-catalytic material which will withstand the conditions of operation, such, for example, as an alloy of 80% nickel, 20% chromium. The walls of the chamber or exit pipe, 6, below the catalyst, are surrounded by a jacket, 8, through which a cooling liquid is circulated. This cooling jacket keeps the walls of the exit pipe and chamber below a temperature at which appreciable catalytic decomposition will take place. In passing through the exit pipe, 6, the gases are also cooled to below a temperature at which appreciable catalytic decomposition will take place. We have found that cooling the surfaces in contact with the gas to a temperature below 500° C. is sufficient to prevent serious loss.

According to our invention, we contemplate a catalyst of small area and of considerable depth, or thickness, such for example, as the type disclosed in our United States Patent 1,919,216, in which the velocities through the catalyst are exceptionally high. With a catalyst of this type, the radiation to the cooler walls will have little effect on the catalyst temperature due to its smaller surface. It will be apparent that a larger catalyst, similar to the cylindrical catalyst disclosed in U. S. Patent, 1,321,376, by Jones and Parsons, could also be used within the scope of our invention by modifying the apparatus illustrated in order to accommodate the different shaped catalyst. The chamber should, for example, be constructed so as to lead the gases directly away from the catalyst surface, preferably at a velocity greater than 20 ft. per second, instead of along the surface as in the Parsons and Jones type of apparatus, and the walls of the chamber on the down stream side of the catalyst should then be cooled. With a catalyst of such large surface, the catalyst temperature would be affected slightly, but this may easily be compensated for by increasing the amount of preheat.

It will be noted from the disclosure of Cederberg that he had no conception of the step of cooling the gases immediately after passing through the catalyst because he has definitely stated that his invention relates to the step of preventing the overheating of the catalyst itself.

While it is common practice to use cooling chambers wherever necessary, and it is a simple mechanical expedient to construct one, the present invention is not one of apparatus but of process in which greatly improved results are obtained by the step of cooling the reaction products at the proper point for a definite purpose, and conveying the gases away from the catalyst immediately after their passing therethrough in such a manner that repeated contact with the catalyst and contact with unreacted material due to convection currents and backward diffusion are eliminated. Contact with hot semi-catalytic surfaces of the containing vessel is also eliminated. The problem was one of determining the precise point where cooling should be made effective, combined with the direction of flow of the gases, and not the mere construction of a cooling chamber as will be apparent.

As many apparently widely different embodiments of this invention may be made without departing from the spirit thereof, it is to be understood that we do not limit ourselves to the foregoing examples or descriptions except as indicated in the following patent claims.

We claim:

1. In the process of oxidizing ammonia to oxides of nitrogen, the steps which comprise passing a mixture of ammonia and an oxygen containing gas through a catalyst in a direction substantially at right angles to the catalyst surface, and at a velocity greater than 20 feet per second, and immediately cooling the surfaces of the walls of the exit from the reaction zone to an extent sufficient to reduce the temperature of the walls to below 500° C.

2. In the process of oxidizing ammonia to oxides of nitrogen, the steps which comprise passing a mixture of ammonia and an oxygen containing gas through a catalyst, composed of platinum group metal, and circulating a cooling liquid through the walls of the exit from the catalyst zone immediately beyond the catalyst to immediately cool the gases.

3. In the process of oxidizing ammonia to oxides of nitrogen, the steps which comprise passing a mixture of ammonia and an oxygen containing gas through a catalyst, composed of platinum group metal, in a direction substantially at right angles to the catalyst surface, and at a velocity greater than 20 feet per second, passing a cooling liquid into contact with the walls of the exit from the catalyst zone to absorb the heat of the gases and reduce the temperature of the walls of the chamber below approximately 500° C., and removing the heat from the system.

4. In the process of oxidizing ammonia to oxides of nitrogen, the steps which comprise passing a mixture of ammonia and an oxygen containing gas through a catalyst at a velocity greater than 20 feet per second, and immediately absorbing the heat through the walls of the exit from the catalyst zone.

STANLEY L. HANDFORTH.
WILLIAM E. KIRST.